(12) United States Patent
Seligmann

(10) Patent No.: US 7,397,787 B2
(45) Date of Patent: Jul. 8, 2008

(54) SERVER-BASED DISCOVERY FOR LOCATION-BASED FORWARDING

(75) Inventor: Doree Duncan Seligmann, New York, NY (US)

(73) Assignee: Avaya Technology Corp, Basking Ridge, NJ (US)

( * ) Notice: Subject to any disclaimer, the term of this patent is extended or adjusted under 35 U.S.C. 154(b) by 1108 days.

(21) Appl. No.: 10/375,271

(22) Filed: Feb. 27, 2003

(65) Prior Publication Data

US 2004/0170137 A1    Sep. 2, 2004

(51) Int. Cl.
*H04L 12/28* (2006.01)
*H04M 3/54* (2006.01)
*H04M 3/42* (2006.01)

(52) U.S. Cl. .................. 370/351; 455/417; 379/211.02

(58) Field of Classification Search .................. None
See application file for complete search history.

(56) References Cited

U.S. PATENT DOCUMENTS

| | | | | |
|---|---|---|---|---|
| 5,928,325 A | * | 7/1999 | Shaughnessy et al. | 709/206 |
| 6,363,248 B1 | * | 3/2002 | Silverman | 455/417 |
| 6,584,316 B1 | * | 6/2003 | Akhteruzzaman et al. | 455/445 |
| 6,603,973 B1 | * | 8/2003 | Foladare et al. | 455/445 |
| 6,879,676 B1 | * | 4/2005 | Contractor | 379/211.01 |
| 7,013,003 B2 | * | 3/2006 | Seligmann | 379/211.02 |

* cited by examiner

*Primary Examiner*—Huy D. Vu
*Assistant Examiner*—Clemence Han
(74) *Attorney, Agent, or Firm*—DeMont & Breyer, LLC (57) ABSTRACT

An apparatus for enabling signals directed to a first telecommunications terminal to be forwarded intelligently to a second telecommunications terminal in the vicinity of the first terminal is disclosed. In particular, the illustrative embodiment automatically forwards signals from a first terminal in a network to the closest terminal in the network that the first terminal is authorized to forward to. In one illustrative embodiment, each switch in the network has an associated location server for determining the closest authorized terminal. In another illustrative embodiment, each switch employs additional logic and data for determining the closest authorized terminal.

16 Claims, 11 Drawing Sheets

SERVER-BASED DISCOVERY FOR LOCATION-BASED FORWARDING

CROSS-REFERENCE TO RELATED APPLICATIONS

The following patent applications are incorporated by reference:
1. U.S. patent application, Ser. No. 10/375,663, filed 27 Feb. 2003, entitled "Authorization-Based Forwarding,"
2. U.S. patent application, Ser. No. 10/375,252, filed 27 Feb. 2003, entitled "Location-Based Forwarding,"
3. U.S. patent application, Ser. No. 10/375,641, filed 27 Feb. 2003, entitled "Peer-to-Peer Discovery For Location-Based Forwarding,"
4. U.S. patent application, Ser. No. 10/375,237, filed 27 Feb. 2003, entitled "Location-Based Forwarding Over Multiple Networks."

FIELD OF THE INVENTION

The present invention relates to telecommunications in general, and, in particular, to forwarding a call or message from one telecommunications terminal to another.

BACKGROUND OF THE INVENTION

Telephone calls are sometimes forwarded from one telephone to another. For example, when a user leaves his or her office to work in a computer laboratory, the user might forward his or her office telephone to a telephone in the computer laboratory. The user thereby specifies ahead-of-time that any future call directed to his or her office telephone should be redirected to the telephone in the computer laboratory (i.e., a call directed to the office telephone will cause the computer laboratory telephone to "ring," while the office telephone will not ring).

As another example, when the user receives a call on his or her office telephone, he or she might wish to transfer the call to another telephone (e.g., a secretary's telephone, etc.) while the call is in progress. Alternatively, the user might wish to include another party in the conversation by bridging the call to an appropriate telephone; this is also known as conference calling.

Forwarding is also commonly employed for email. In particular, a forwarding mechanism is established (e.g., creating a forward file in a UNIX-based system, etc.) so that future email messages addressed to a first address are automatically forwarded to a second address.

SUMMARY OF THE INVENTION

The present invention is a method for enabling signals (e.g., voice, video, text, etc.) directed to a first telecommunications terminal (e.g., telephone, computer, pager, etc.) in a network to be forwarded to a second telecommunications terminal in the network, which is or was in the "vicinity" of the first terminal. In particular, the illustrative embodiment automatically forwards signals directed to a first telecommunications terminal in a network to the closest telecommunications terminal in the network that the first telecommunications terminal is authorized to forward to.

The illustrative embodiment comprises: a processor for (i) receiving a forwarding request associated with a first telecommunications terminal, (ii) determining a first location that is the location of the first telecommunications terminal, and (iii) ascertaining the identity of a second telecommunications terminal that is closest to the first location; and a transmitter for sending a forwarding message that causes a signal directed to the first telecommunications terminal to be forwarded to the second telecommunications terminal.

DETAILED DESCRIPTION

Definitions—Although the illustrative embodiment is disclosed in the context of telephones, it will be clear to those skilled in the art how to use embodiments of the present invention for other devices such as pagers, personal digital assistants (PDAs), etc. Consequently, the term "contact identifier" and its inflected forms are defined as a string of symbols that uniquely specifies a telecommunications terminal (e.g., telephone number, email address, Internet Protocol (IP) address, etc.). Similarly, for the purposes of this specification the term "call" is defined to encompass all kinds of communications (e.g. telephone call, email message, interactive text chat, videoconference, etc.), and it will be clear to those skilled in the art how to use embodiments of the present invention for such alternative means of communication.

For the purposes of this specification, the term "forwarding out" and its inflected forms are defined as forwarding a call from a first telecommunications terminal to a second telecommunications terminal as a result of a forwarding request originating at the first telecommunications terminal. Similarly, for the purposes of this specification the term "forwarding in" and its inflected forms are defined as forwarding a call from a first telecommunications terminal to a second telecommunications terminal as a result of a forwarding request originating at the second telecommunications terminal.

For some kinds of communication, such as telephone calls and interactive text chat, forwarding can be established either (i) before a call is initiated, or (ii) during a call (i.e., while a call is in progress). For some other kinds of communication such as email, however, forwarding typically applies to (i) only.

For case (i), a call can be forwarded from a first terminal to a second terminal so that either (ia) only the second terminal is notified of the incoming call (i.e., only the second terminal "rings"), or (ib) both the first and second terminals are notified of the incoming call (i.e., both terminals ring). For case (ii), a call can be forwarded from a first terminal to a second terminal so that either (iia) the first communications terminal no longer participates in the call (i.e., only the second terminal participates), or (iib) the first terminal still participates in the call (i.e., both terminals participate).

Consequently, for the purposes of this specification: the term "redirecting" and its inflected forms are defined as forwarding a call or message in accordance with (ia) above; the term "connecting" and its inflected forms are defined as forwarding a call or message in accordance with (ib) above; the term "transferring" and its inflected forms are defined as forwarding a call or message in accordance with (iia) above; and the term "bridging" and its inflected forms are defined as forwarding a call or message in accordance with (iib) above.

In addition, for the purposes of this specification: the term "redirecting out" and its inflected forms are defined as forwarding out a call or message in accordance with (ia) above; the term "connecting out" and its inflected forms are defined as forwarding out a call or message in accordance with (ib) above; the term "transferring out" and its inflected forms are defined as forwarding out a call or message in accordance with (iia) above; and the term "bridging out" and its inflected forms are defined as forwarding out a call or message in accordance with (iib) above.

Similarly, for the purposes of this specification: the term "redirecting in" and its inflected forms are defined as forwarding in a call or message in accordance with (ia) above; the term "connecting in" and its inflected forms are defined as forwarding in a call or message in accordance with (ib) above; the term "transferring in" and its inflected forms are defined as forwarding in a call or message in accordance with (iia) above; and the term "bridging in" and its inflected forms are defined as forwarding in a call or message in accordance with (iib) above.

Figure 1:
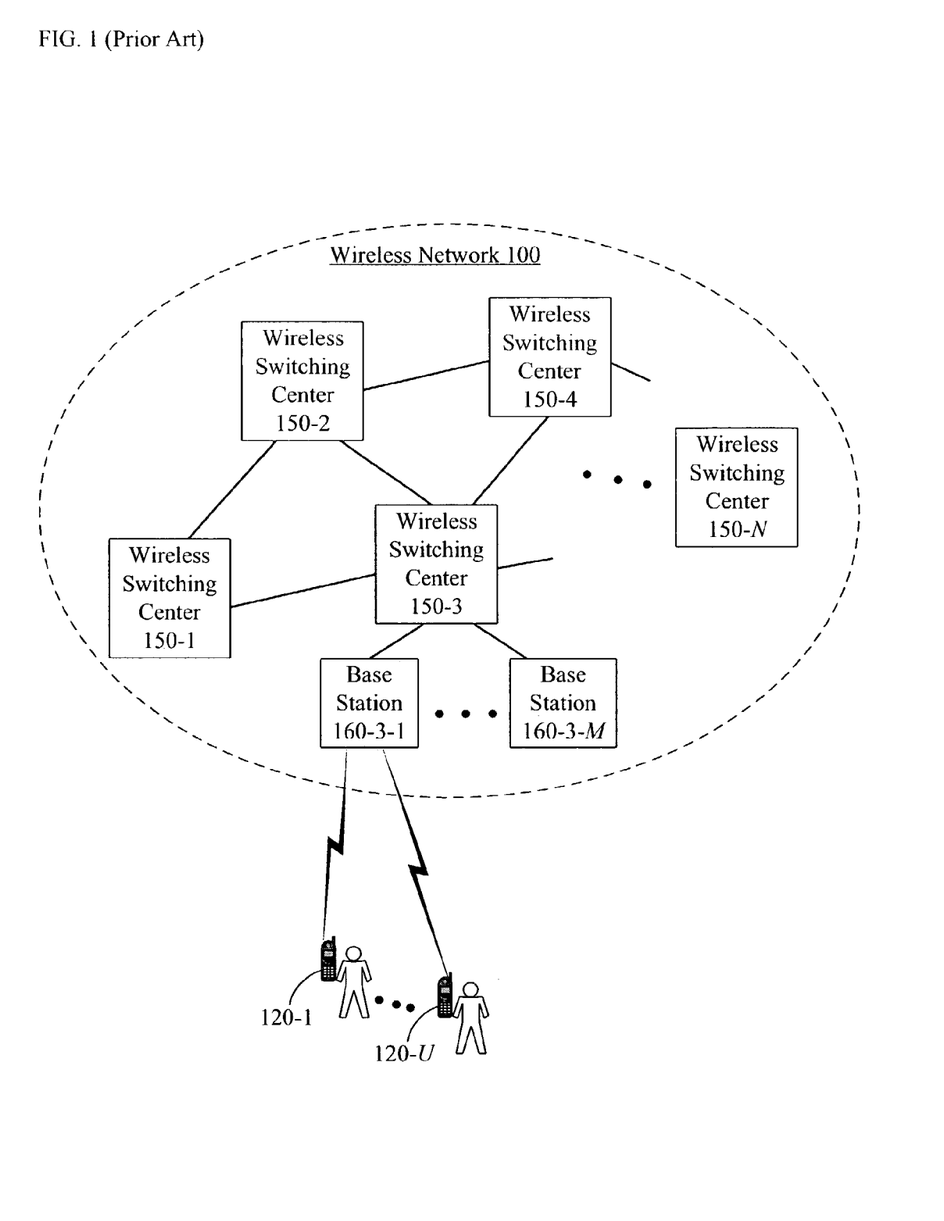
FIG. 1 depicts a block diagram of the salient components of exemplary wireless network 100 in the prior art.

The Illustrative Embodiments—FIG. 1 depicts a block diagram of the salient components of exemplary wireless network 100 in the prior art. As shown in FIG. 1, wireless network 100 comprises N wireless switching centers 150-1 through 150-N, where N is a positive integer, as is well known in the art. As shown in FIG. 1, wireless switching center 150-3 communicates with M base stations 160-3-1 through 160-3-M, where M is a positive integer, as is also well known in the art. For clarity, base stations are shown for wireless switching center 150-3 only, even though each wireless switching center 150-$i$ in wireless network 100 typically is connected to a respective plurality of base stations.

As shown in FIG. 1, base station 160-3-1 communicates wirelessly with wireless telecommunications terminals 120-1 through 120-U, where U is a positive integer, as is well known in the art. For clarity, wireless telecommunications terminals are shown for base station 160-3-1 only, even though each base station typically communicates with a respective plurality of telecommunications terminals.

Figure 2:
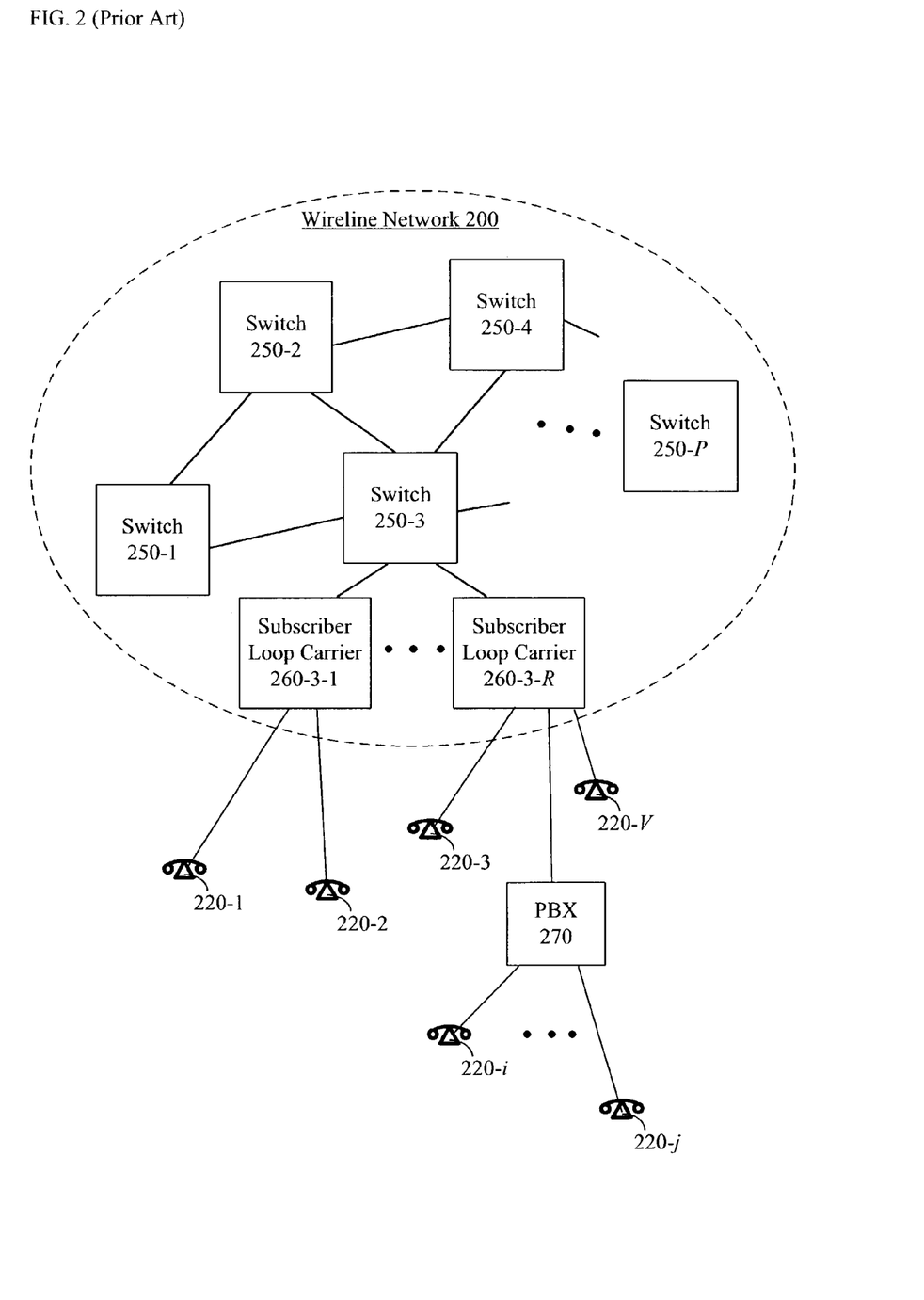
FIG. 2 depicts a block diagram of the salient components of exemplary wireline network 200 in the prior art.

FIG. 2 depicts a block diagram of the salient components of exemplary wireline network 200 (e.g., the Public Switched Telephone Network [PSTN], etc.) in the prior art. As shown in FIG. 2, wireline network 200 comprises P switches 250-1 through 250-P, where P is a positive integer, as is well known in the art. As shown in FIG. 2, switch 250-3 is connected to R subscriber loop carriers 260-3-1 through 260-3-R, where R is a positive integer, as is also well known in the art. For clarity, subscriber loop carriers are shown for switch 250-3 only, even though each switch 250-$i$ in wireless network 230 typically is connected to a respective plurality of subscriber loop carriers.

As shown in FIG. 2, subscriber loop carrier 260-3-1 is connected to wireline telecommunications terminals 220-1 through 220-V, where V is a positive integer, either directly, or via private branch exchange (PBX) 270, as is well known in the art. Again, in the interest of clarity, wireline telecommunications terminals are shown for subscriber loop carrier 260-3-1 only, even though typically each base station communicates with a respective plurality of telecommunications terminals.

Figure 3:
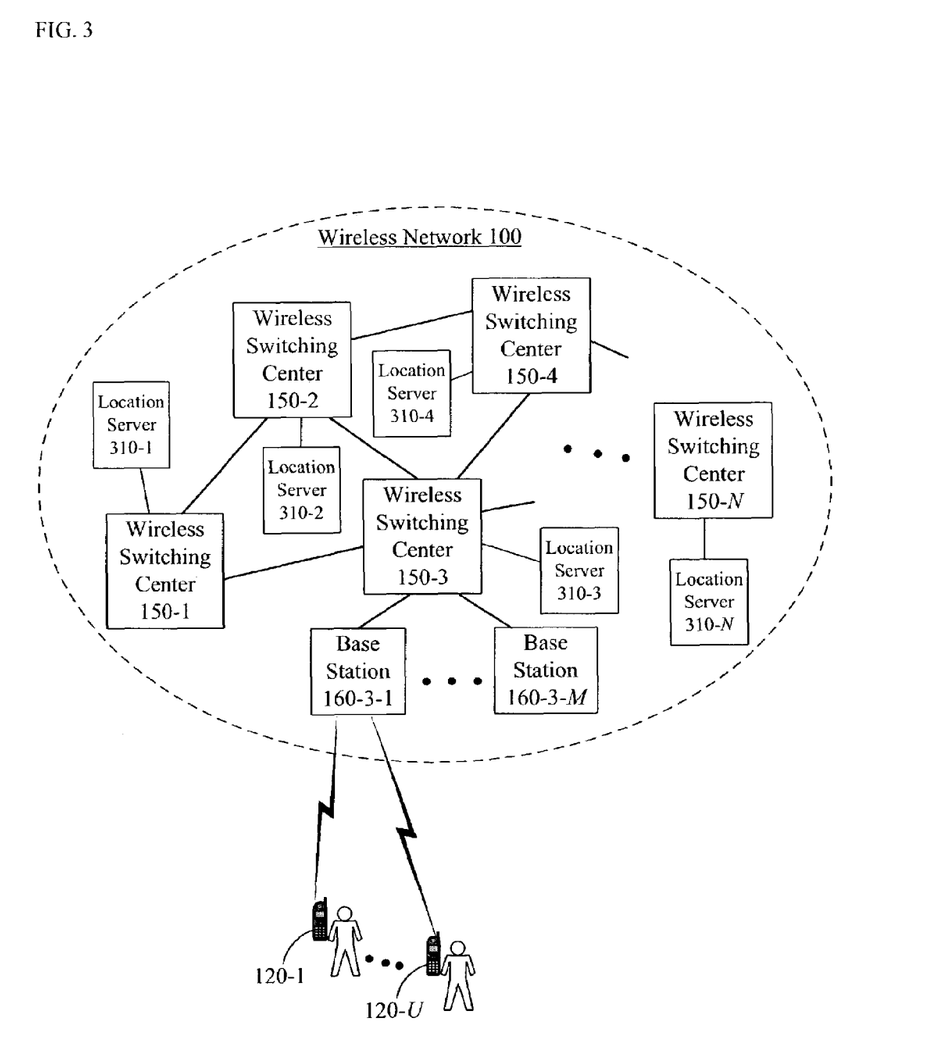
FIG. 3 depicts a block diagram of the salient components of exemplary wireless network 100, as depicted in FIG. 1, in accordance with the first illustrative embodiment of the present invention.

FIG. 3 depicts a block diagram of the salient components of exemplary wireless network 100, as depicted in FIG. 1, in accordance with the first illustrative embodiment of the present invention. In this embodiment, each wireless switching center 150-$i$ has associated location server 310-$i$. Location server 310-$i$ keeps track of the respective locations of wireless telecommunications terminals in wireless switching center 150-$i$'s area of coverage, as disclosed below in the description of FIG. 4.

Figure 4:
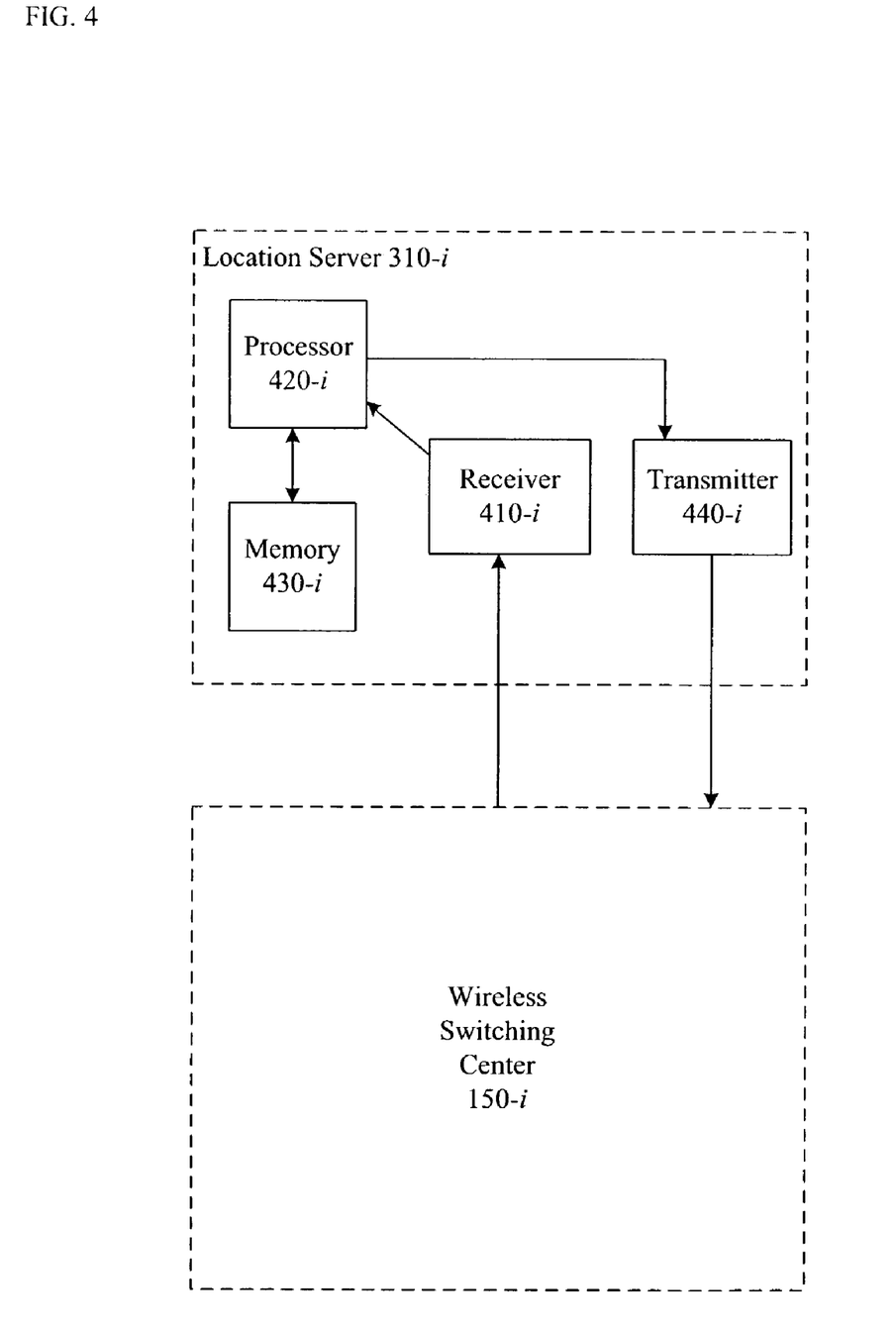
FIG. 4 depicts a block diagram of the salient components of location server 310-i, as depicted in FIG. 3, in accordance with the first illustrative embodiment of the present invention.

FIG. 4 depicts a block diagram of the salient components of location server 310-$i$, as depicted in FIG. 3, in accordance with the first illustrative embodiment of the present invention. As shown in FIG. 4, location server 310-$i$ comprises receiver 410-$i$, processor 420-$i$, memory 430-$i$, and transmitter 440-$i$.

Receiver 410-$i$, receives (i) current locations for telecommunications terminals in wireless switching center 150-$i$'s area of coverage from wireless switching center 150-$i$, and (ii) forwarding requests from wireless switching center 150-$i$. As is well understood in the art, receiver 410-$i$ can receive the locations of terminals in wireless switching center 150-$i$'s area of coverage by a variety of methods (e.g., a global positioning system [GPS] receiver embedded in each terminal, triangulation, radio beacons, radio-frequency fingerprinting [U.S. Pat. No. 6,393,294, incorporated by reference], etc.)

When receiver 410-$i$ receives a location, it passes the data to processor 420-$i$. Processor 420-$i$ writes the location data to a location table stored in memory 430-$i$, in well-known fashion. If the terminal already has an entry in the location table, its location is updated accordingly; otherwise (e.g., the associated terminal entered the corresponding area of coverage, etc.), a new entry is added to the location table. In order to prevent the location table from monotonically increasing in size and potentially exhausting memory 430-$i$, wireless switching center 150-$i$ can send a notification message to receiver 410-$i$ when a terminal disconnects from wireless switching center 150-$i$ (e.g., when the terminal is turned off, or when the terminal leaves wireless switching center 150-$i$'s area of coverage, etc.) In addition, each entry in the location table can have an associated timestamp, and processor 420-$i$ can periodically remove entries from the table with stale timestamps.

When receiver 410-$i$ receives a forwarding request, it passes the request to processor 420-$i$. In some embodiments, the request might contain the current location of the requesting terminal, while in some other embodiments, the request might solely specify the contact identifier of the terminal, in which case processor 420-$i$ performs a lookup on memory 430-$i$ to determine the location of the requesting terminal.

Processor 420-$i$ consults memory 430-$i$ to find the terminal closest to the requesting terminal. As is well-known in the art, there are a variety of ways to find the closest terminal, some more efficient than others. One way is to proceed through each entry in the list, computing the distance between the requesting terminal and the entry's location, and then selecting the terminal corresponding to the entry with the smallest distance. Another, more efficient way, is to maintain a spatial database containing each terminal's location; as is well known in the art, a spatial database stores a set of points in n-dimensional space (e.g., two-dimensional Cartesian locations, etc.) and is designed to efficiently perform geometric-based queries such as finding a point in the database closest to a particular location.

In some embodiments, an authorization facility might be employed to prevent forwarding of calls from a first telecommunications terminal to a second telecommunications terminal when such forwarding is not authorized. For example, copending U.S. patent application "Authorization-Based Forwarding," (Attorney Docket: 630-017us) discloses such a facility that employs authorization tables associated with each telecommunications terminal for determining whether a particular forwarding operation is allowed. In the above-referenced U.S. patent application, the authorization tables are stored in a centralized database; in some embodiments of the present invention, however, it might be advantageous to distribute the authorization tables among location servers 310 (i.e., store the locally-pertinent information in memories 430). In the latter arrangement, when a wireless telecommunications terminal moves from the coverage area of one wireless switching center 150-$i$ to another wireless switching center 150-$j$, processor 420-$i$ can send the authorization tables for that terminal to location server 310-$j$ via transmitter 440-$i$, wireless switching center 150-$i$, and wireless switching center 150-$j$.

In embodiments employing an authorization facility, processor 420-$i$ consults memory 430-$i$ to find the closest terminal for which the requested forwarding operation (e.g., transferring out, bridging in, etc.) is permitted. It will be clear to those skilled in the art how to incorporate an authorization facility into the techniques disclosed above (e.g., linear traversal of the location table, a spatial database query, etc.) to enable processor 420-$i$ to provide this functionality.

After the closest terminal (or the closest authorized terminal, as appropriate) is determined, processor 420-$i$ sends, via transmitter 440-$i$, a message to wireless switching center 150-$i$ containing (i) the contact identifier of the requesting terminal, and (ii) the contact identifier of the closest terminal. As is well understood in the art, for forwarding out of telephone calls, the forwarding message causes (i) the forward flag to be enabled in the record for the first telecommunications terminal's contact identifier, and (ii) the forwarding number in this record to be set to the closest terminal's contact identifier (or vice versa for forwarding in operations). For forwarding out of email messages, the forwarding message is directed to the appropriate email server to establish forwarding of messages directed to the requesting terminal (i.e., the requesting terminal's email address) to the closest terminal's email address (or vice versa for forwarding in operations), as is well understood in the art. For peer-to-peer communications employing the Session Initiation Protocol (SIP), such as instant messaging (IM), the forwarding message is directed to the appropriate SIP server; for forwarding out operations, this message specifies updating (a) the contact identifier (i.e., IP address) associated with the user of the requesting terminal t1, to (b) the closest terminal's IP address (or vice versa for forwarding in operations), as is well understood in the art.

As will be understood by those skilled in the art, processor 420-$i$ might be a programmed general-purpose processor, or a "hard-wired" or special-purpose processor. Similarly, memory 430-$i$ can take a variety of forms, such as a random-access memory, a flash memory, a disk drive, etc.

Figure 5:
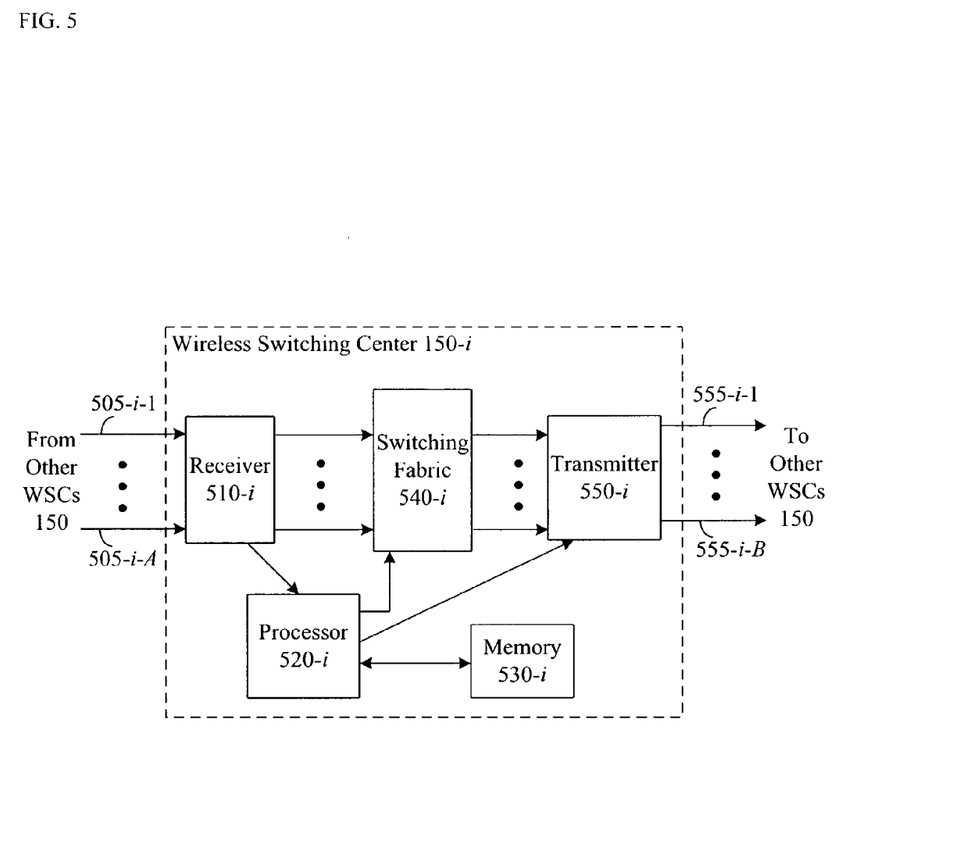
FIG. 5 depicts a block diagram of the salient components of wireless switching center 150-i, as depicted in FIG. 1, in accordance with the second illustrative embodiment of the present invention.

FIG. 5 depicts a block diagram of the salient components of wireless switching center 150-$i$, as depicted in FIG. 1, in accordance with the second illustrative embodiment of the present invention. In this embodiment, the functionality performed by location server 310-$i$ in the first embodiment is performed by wireless switching center 150-$i$, thereby obviating the need for a separate location server 310-$i$.

As shown in FIG. 5, wireless switching center 150-$i$ comprises receiver 510-$i$, processor 520-$i$, memory 530-$i$, switching fabric 540-$i$, and transmitter 550-$i$. As will be recognized by those skilled in the art, the components of wireless switching center 150-$i$ shown in FIG. 5 are typically found in a wireless switching center 150-$i$ of the prior art (e.g., processor 520-$i$ and memory 530-$i$ typically support a multitude of tasks and services such as switching, handoffs, "caller ID," etc.) Consequently, in this embodiment memory 530-$i$ stores, in addition to the data of the prior art, the location tables (and, if appropriate, local authorization tables) stored in memory 430-$i$ of location server 310-$i$ in the first illustrative embodiment; similarly, processor 520-$i$ performs, in addition to the usual functions of the prior art, the logic of location server 310-$i$'s processor 420-$i$ in the first illustrative embodiment, as disclosed above.

It will be appreciated by those skilled in the art that some alternative embodiments might employ a combination of the first and second embodiments disclosed above. Such a combination would employ location server 310-$i$, as in the first embodiment, but would distribute the functionality concerning location and authorization between location server 310-$i$ and wireless switch center 150-$i$. For example, some such combinations might store the authorization tables in memory 530-$i$ and the location table in memory 540-$i$, with processors 420-$i$ and 520-$i$ accordingly dividing the logic disclosed above; it will be clear to those skilled in the art how to make and use this combination, or other such possible combinations. It will also be appreciated by those skilled in the art that these combinations are functionally equivalent to the first and second embodiments disclosed above.

Figure 6:
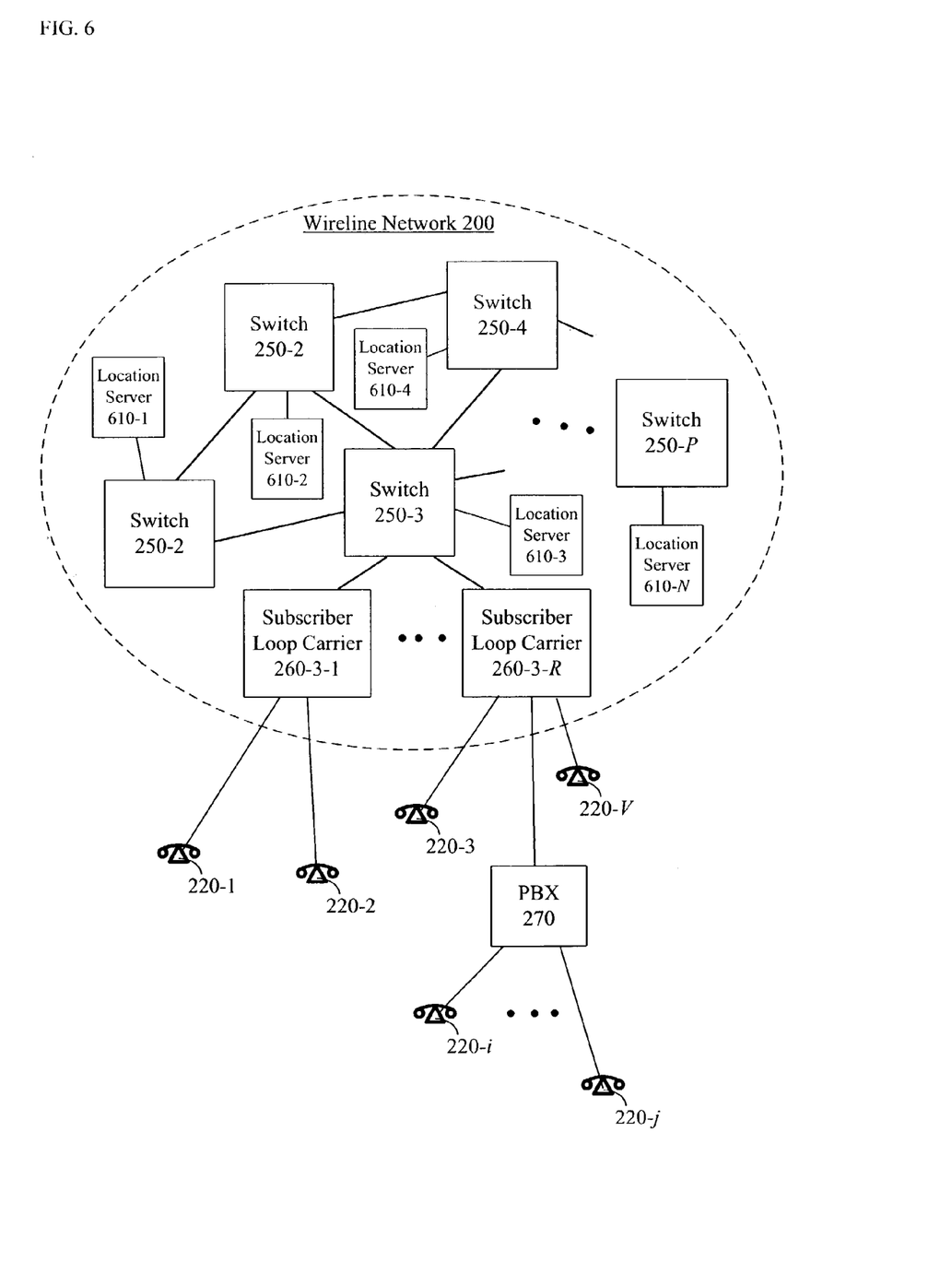
FIG. 6 depicts a block diagram of the salient components of exemplary wireline network 200, as depicted in FIG. 2, in accordance with the first illustrative embodiment of the present invention.

FIG. 6 depicts a block diagram of the salient components of exemplary wireline network 200, as depicted in FIG. 2, in accordance with the first illustrative embodiment of the present invention. In this embodiment, each switch 250-$i$ has associated location server 610-$i$. Location server 610-$i$ keeps track of the respective locations of wireline telecommunications terminals in switch 250-$i$'s domain, as disclosed below in the description of FIG. 4.

Figure 7:
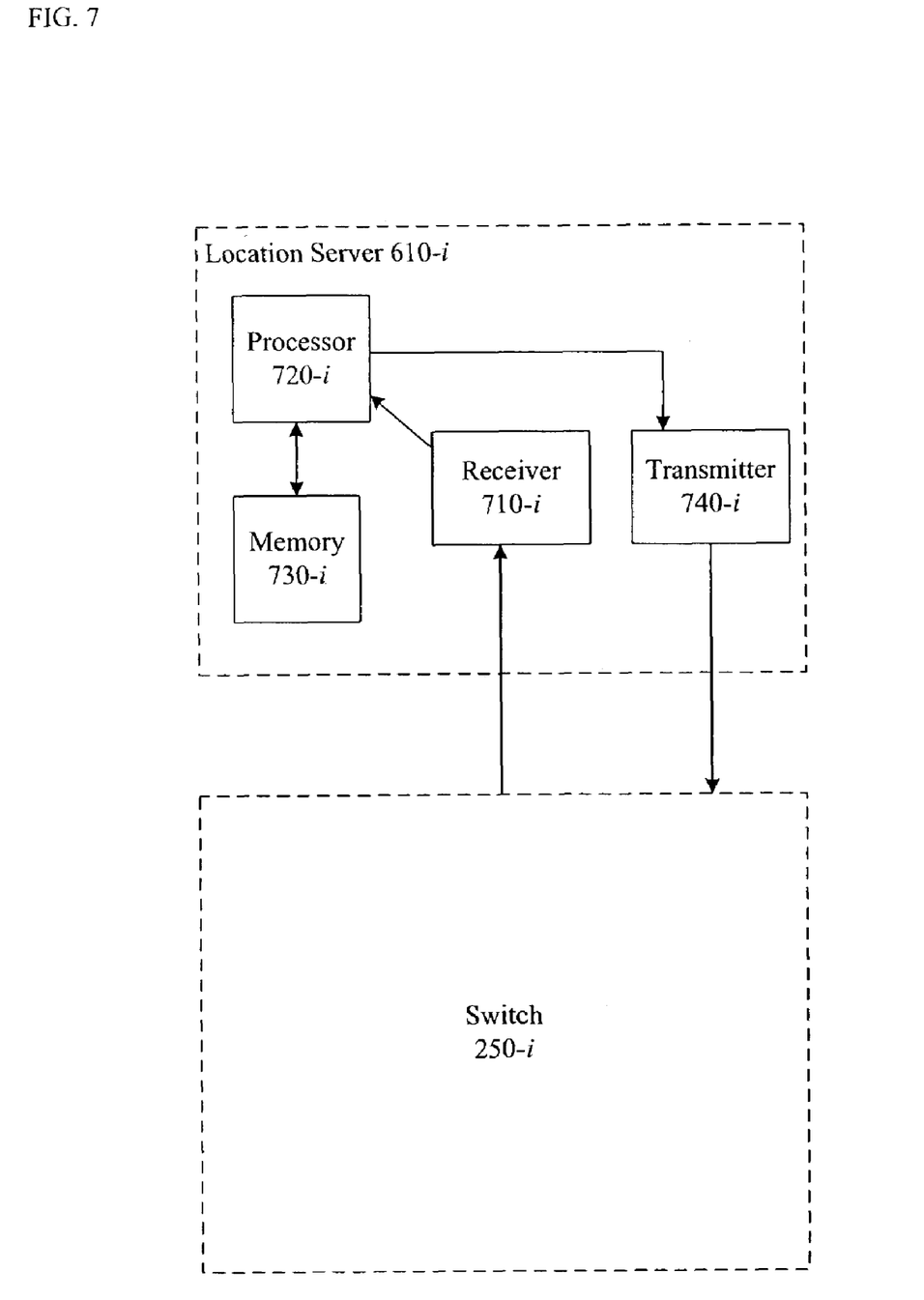
FIG. 7 depicts a block diagram of the salient components of location server 610-i, as depicted in FIG. 6, in accordance with the first illustrative embodiment of the present invention.

FIG. 7 depicts a block diagram of the salient components of location server 610-$i$, as depicted in FIG. 6, in accordance with the first illustrative embodiment of the present invention. As shown in FIG. 7, location server 610-$i$ comprises receiver 710-$i$, processor 720-$i$, memory 730-$i$, and transmitter 740-$i$.

Memory 730-$i$ stores a location table (and, if appropriate, authorization tables) as disclosed above for memory 430-$i$.

Receiver 710-$i$ receives (i) current locations of cordless wireline telecommunications terminals (for example, short-range cordless telephones, as are well-known in the art) in switch 250-$i$'s domain from switch 250-$i$, and (ii) forwarding requests from switch 250-$i$. When receiver 710-$i$ receives one or more terminal locations, it passes the data to processor 720-$i$. Processor 720-$i$ writes the location data to a location table stored in memory 730-$i$ in well-known fashion.

The location table in memory 730-$i$ differs from the location table in memory 430-$i$ (i.e., for wireless telecommunications terminals) in that the contact identifiers stored in the location table rarely change, since a contact identifier typically is within the domain of a particular switch 250-$i$ for very long periods of time, if not permanently. In addition, many of the locations in the location table in memory 730-$i$ are static (e.g., corresponding to conventional corded wireline telephones, etc.), thus obviating the need for storing a timestamp and checking for stale entries.

The location table in memory 730-$i$ specifies a one-to-one relation between contact identifiers and locations, as is the case for the location table in memory 430-$i$. For wireline telecommunications terminals that are uniquely identified by a contact identifier (e.g., a payphone, an office desktop phone connected to a PBX, etc.), as is the case for wireless telecommunications terminals as practiced in the art, memory 730-$i$ stores locations in the same manner as memory 430-$i$. For wireline telecommunications terminals that are not uniquely identified by a contact identifier, however (e.g., a wireline telephone in a residential house with a single telephone line and multiple wireline telephones, etc.), the location table in memory 730-$i$ specifies a single "virtual" location for the contact identifier (e.g., the geographic center of multiple locations, etc.)

When receiver 710-$i$ receives a forwarding request, it functions in the same manner as receiver 410-$i$ (i.e., it passes the request to processor 720-$i$). Processor 720-$i$ consults memory 730-$i$ to find the terminal closest to the requesting terminal (or, as appropriate, the closest authorized terminal) in the same manner as processor 420-$i$ above.

After the closest terminal is determined, processor 720-$i$ sends, via transmitter 740-$i$, a message to switch 250-$i$ containing the same information as disclosed above for processor 420-$i$ (i.e., the contact identifiers of the requesting terminal and the closest terminal). For telephone calls, switch 250-$i$, upon receiving the message, sets the appropriate record's forwarding flag and forwarding field as disclosed above for wireless switching center 150-$i$. For forwarding out of email messages, the forwarding message is directed to the appropriate email server to establish forwarding of (a) messages directed to the requesting terminal's email address, to (b) the closest terminal's email address (or vice versa for forwarding in operations), as disclosed above. For peer-to-peer communications, the forwarding message is directed to the appropriate SIP server, and specifies updating of the appropriate IP address, as disclosed above.

Figure 8:
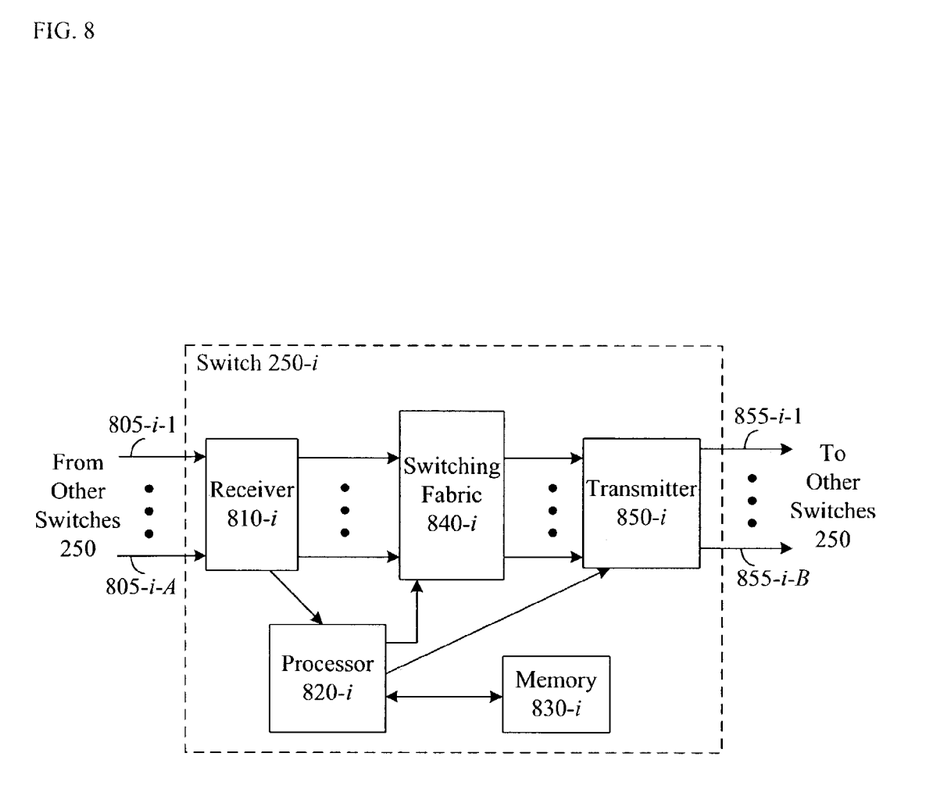
FIG. 8 depicts a block diagram of the salient components of switch 250-i, as depicted in FIG. 2, in accordance with the second illustrative embodiment of the present invention.

FIG. 8 depicts a block diagram of the salient components of switch 250-$i$, as depicted in FIG. 2, in accordance with the second illustrative embodiment of the present invention. As shown in FIG. 8, switch 250-$i$ comprises receiver 810-$i$, processor 820-$i$, memory 830-$i$, switching fabric 840-$i$, and transmitter 850-$i$.

As will be recognized by those skilled in the art, the components of switch 250-$i$ shown in FIG. 8 are typically found in a switch 250-$i$ of the prior art. Consequently, in this embodiment memory 830-$i$ stores, in addition to the data of the prior art, the location table (and, if appropriate, local authorization tables) stored in memory 730-$i$ of location server 610-$i$ in the first illustrative embodiment; similarly, processor 820-$i$ performs, in addition to the usual functions of the prior art, the logic of location server 610-$i$'s processor 720-$i$ in the first illustrative embodiment, as disclosed above. It will be appreciated by those skilled in the art that some alternative embodiments might employ a combination of the first and second embodiments comprising location server 610-$i$ and switch 250-$i$, as disclosed above for location server 310-$i$ and wireless switching center 150-$i$.

The Illustrative Embodiment for Multiple Networks—Up to this point, the specification has disclosed implementations of location-based forwarding for wireless network 100 and wireline network 200 in isolation. However, it might be advantageous to have location-based forwarding work across wireless network 100 and wireline network 200. For example, a user of a wireless telecommunications terminal might want to forward a call to the closest telecommunications terminal, regardless of whether the closest terminal is wireless or wireline. In addition, it might be desirable to have location-based forwarding work across multiple wireless and/or wireline networks. For example, currently in the United States there are several wireless service providers (e.g., AT&T Wireless, Verizon Wireless, Sprint PCS, Cingular Wireless, etc.), and in some embodiments a user might want to automatically forward a call to the closest telecommunications terminal, regardless of whether that terminal is subscribed to the same service as the forwarding terminal. The foregoing disclosure teaches how to augment the illustrative embodiments disclosed above to provide this functionality.

Figure 9:
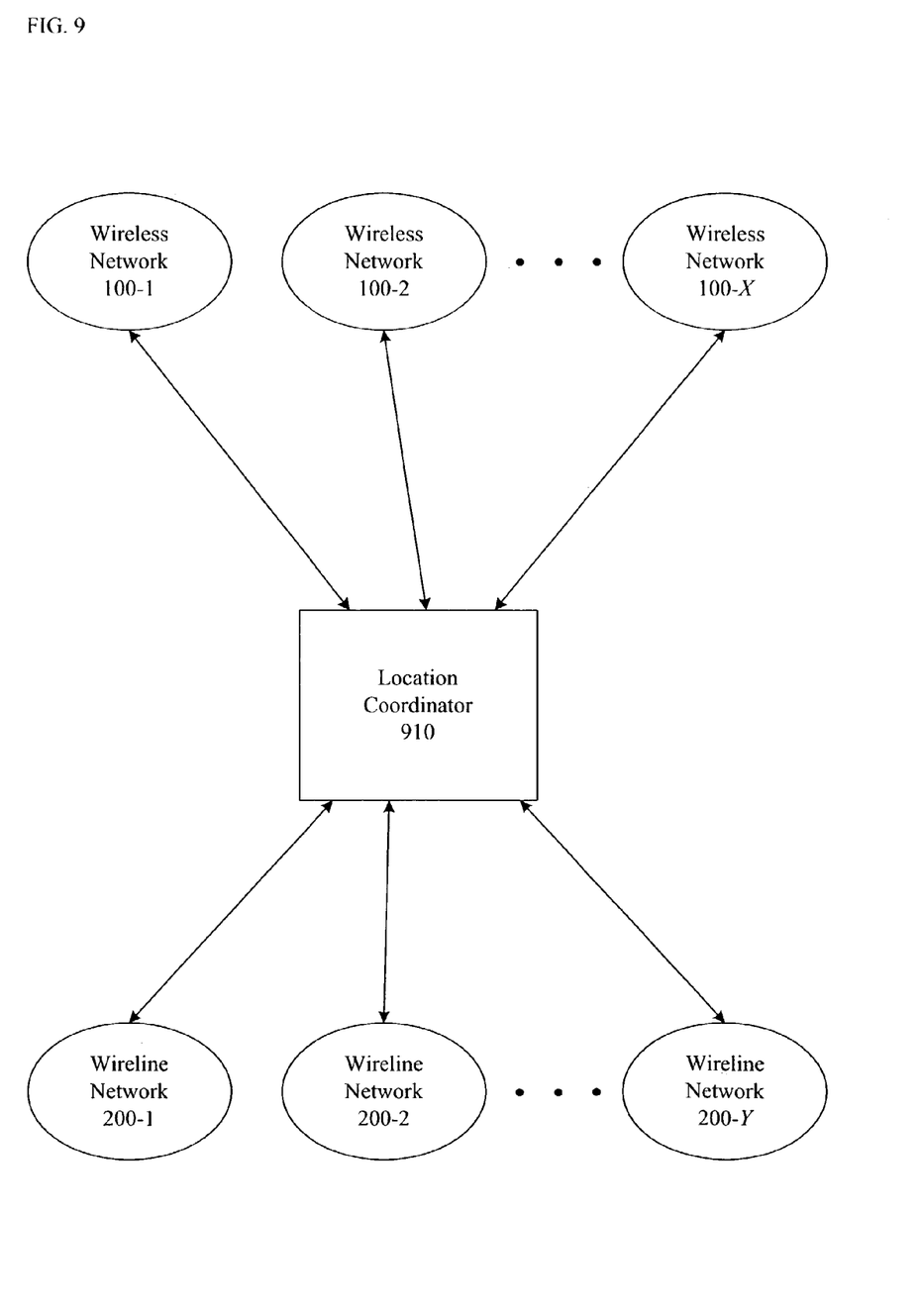
FIG. 9 depicts a block diagram of an architecture for enabling location-based forwarding across multiple wireless networks 100, as depicted in FIG. 1, and/or multiple wireline networks 200, as depicted in FIG. 2, in accordance with the illustrative embodiments of the present invention.

FIG. 9 depicts a block diagram of an architecture for enabling location-based forwarding across multiple wireless networks 100, as depicted in FIG. 1, and/or multiple wireline networks 200, as depicted in FIG. 2, in accordance with the illustrative embodiments of the present invention. As shown in FIG. 9, the architecture comprises location coordinator 910, X wireless networks 100-1 through 100-X, where X is a positive integer, and Y wireline networks 100-1 through 100-Y, where Y is a positive integer. As shown in FIG. 9, location coordinator 910 communicates with each wireless network 100 and each wireline network 200 via respective bidirectional communication channels. The operation of location coordinator 910, and its interaction with wireless networks 100-1 through 100-X and wireline networks 100-1 through 100-Y, is disclosed below in the descriptions of FIG. 10 and FIG. 11.

Figure 10:
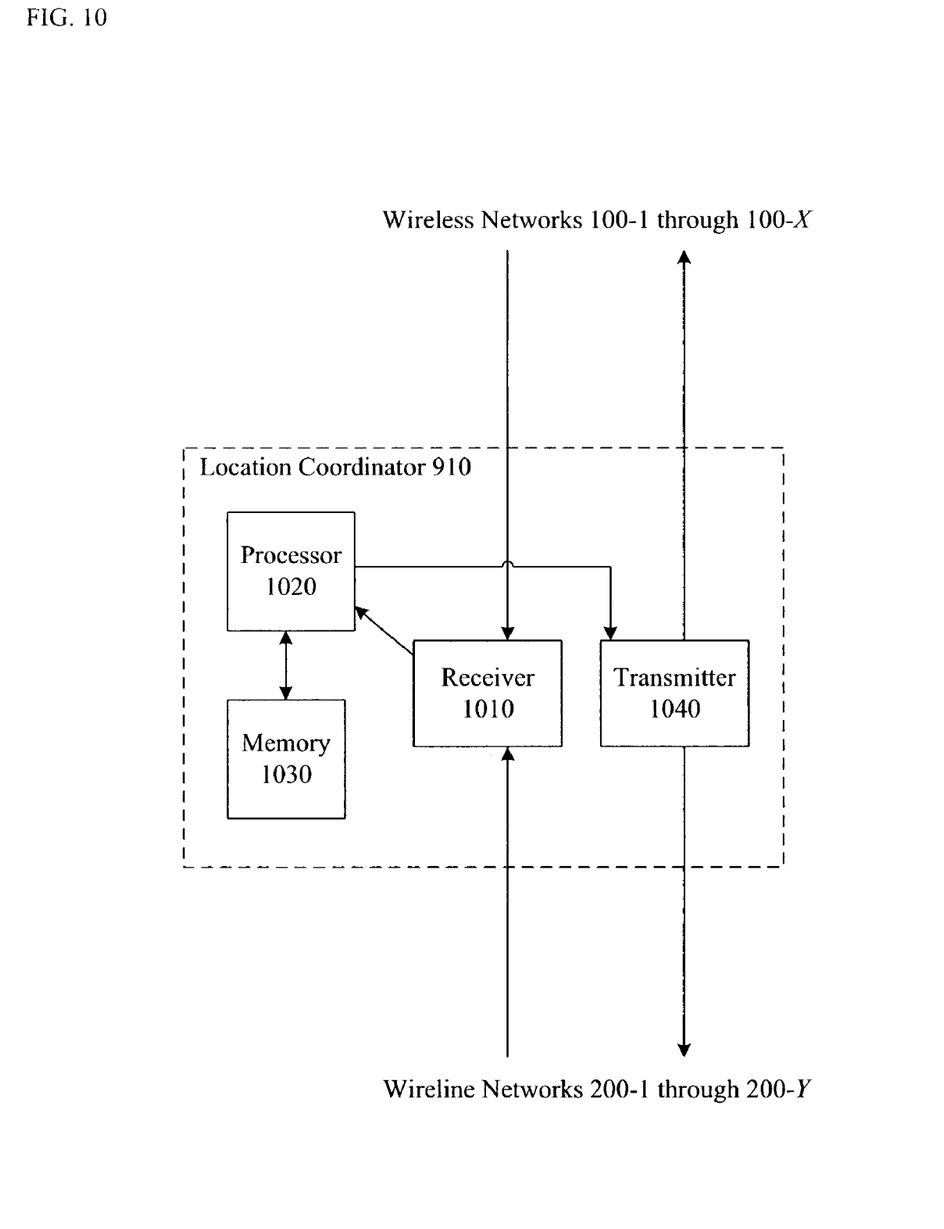
FIG. 10 depicts a block diagram of the salient components of location coordinator 910, as depicted in FIG. 9, in accordance with the illustrative embodiments of the present invention.

FIG. 10 depicts a block diagram of the salient components of location coordinator 910 in accordance with the illustrative embodiments of the present invention. As shown in FIG. 10, location coordinator 910 comprises receiver 1010, processor 1020, memory 1030, and transmitter 1040, as are well-known in the art. The operation of these components in accordance with the illustrative embodiments of the present invention is disclosed below in the description of FIG. 11.

Figure 11:
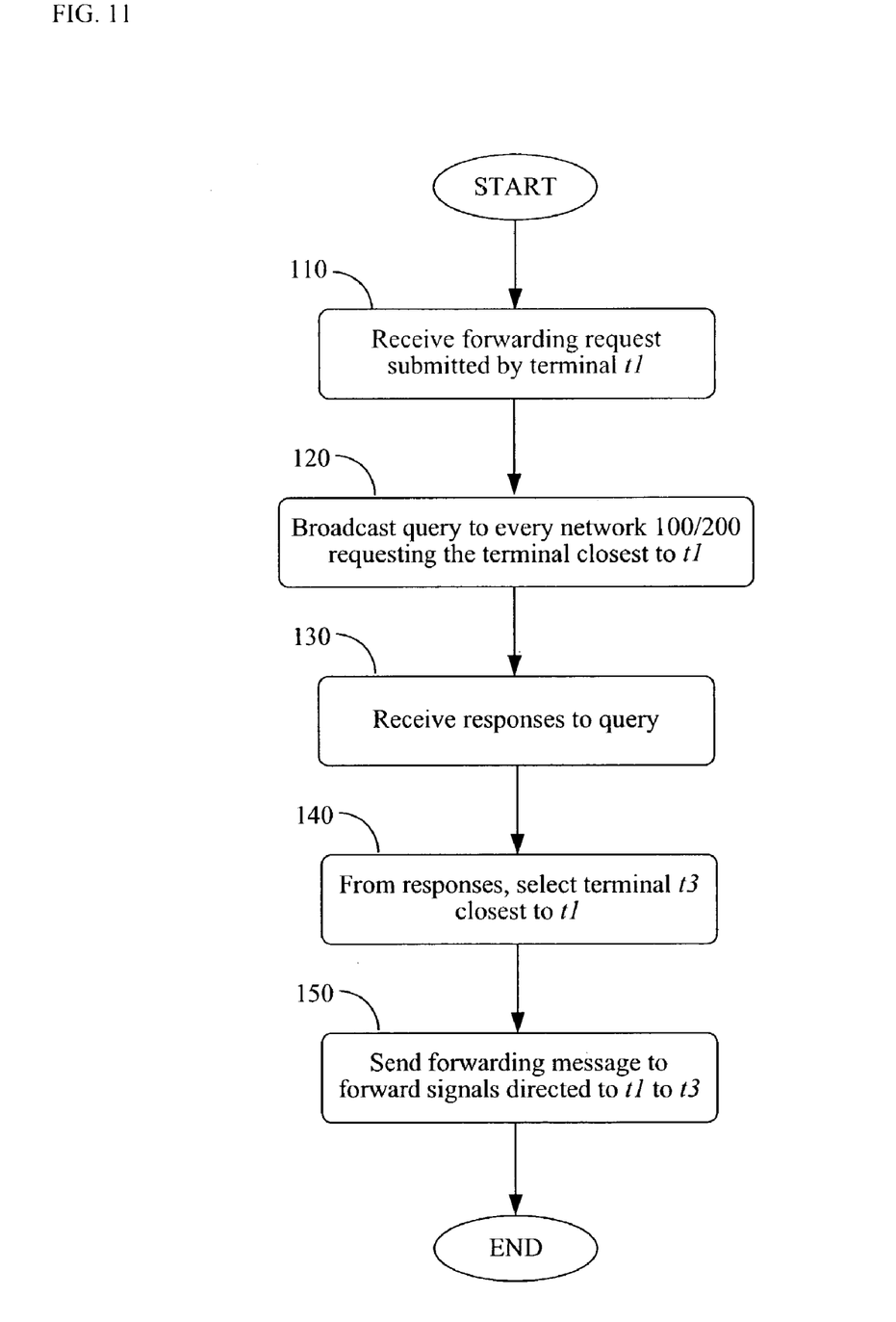
FIG. 11 depicts a flowchart of the operation of location coordinator 910, as depicted in FIG. 9, and its interaction with wireless networks 100, as depicted in FIG. 1, and wireline networks 200, as depicted in FIG. 2, in accordance with the illustrative embodiments of the present invention.

FIG. 11 depicts a flowchart of the operation of location coordinator 910, wireless networks 100, and wireline networks 200, in accordance with the illustrative embodiments of the present invention.

At task 1110, receiver 1010 receives a forwarding request from the network 100-$i$ (or 200-$i$) corresponding to the telecommunications terminal t1 that submitted the request, and passes this forwarding request to processor 1020. The forwarding request comprises (i) t1's contact identifier, (ii) t1's location, (iii) the contact identifier of the telecommunications terminal t2 in network 100-$i$ (or 200-$i$) closest to t1, and (iv) the location of t2.

At task 1120, processor 1020 broadcasts, via transmitter 1040, a query to every wireless and wireline network (except 100-$i$ [or 200-$i$]) specifying the location of t1 and requesting the contact identifier and location of the terminal in that network closest to t1. As will be appreciated by those skilled in the art, the query might equivalently request, instead of the location of the closest terminal, the distance between the closest terminal and t1. Similarly, for embodiments employing an authorization facility, the query would specify the requested forwarding operation (e.g., transferring out, bridging in, etc.) and request the closest terminal for which the forwarding operation is permitted.

At task 1130, receiver 1010 receives responses to the query and passes these responses to processor 1020.

At task 1140, processor 1020 selects, from among t2 and all the responses, the telecommunications terminal t3 closest to t1.

At task 1150, processor 1020 sends, via transmitter 1040, a forwarding message to network 100-$i$ (or 200-$i$) to effect forwarding from t1's contact identifier to t3's contact identifier. As is well understood in the art, for telephone calls the forwarding message is directed to the appropriate switch or wireless switching center, which causes: (i) the forward flag to be enabled in the record for the first telecommunications terminal's contact identifier, and (ii) the forwarding number in this record to be set to terminal t3's contact identifier. For email messages, the forwarding message is directed to the appropriate email server to establish forwarding of messages directed to t1 (i.e., terminal t1's email address) to terminal t3's email address, as is well understood in the art. For peer-to-peer communications employing the Session Initiation Protocol (SIP), such as instant messaging (IM), the forwarding message is an update message directed to the appropriate SIP server for updating the contact identifier (i.e., IP address) associated with the user of terminal t1 to terminal t3's IP address, as is well understood in the art.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
  a processor for
    receiving a transferring out request associated with a first telecommunications terminal,
    determining a first location that is the location of said first telecommunications terminal, and
    ascertaining the identity of a second telecommunications terminal that is closest to said first location; and
  a transmitter for sending a message that causes a signal directed to said first telecommunications terminal to be transferred out to said second telecommunications terminal.

2. The apparatus of claim 1 further comprising a memory for storing the locations of a set of telecommunications terminals;
  wherein said processor's ascertaining is based on the contents of said memory; and
  wherein said set of telecommunications terminals comprises said first telecommunications terminal and said second telecommunications terminal.

3. An apparatus comprising:
  a processor for
    receiving a transferring in request associated with a first telecommunications terminal,
    determining a first location that is the location of said first telecommunications terminal, and
    ascertaining the identity of a second telecommunications terminal that is closest to said first location; and
  a transmitter for sending a message that causes a signal directed to said second telecommunications terminal to be transferred in to said first telecommunications terminal.

4. The apparatus of claim 3 further comprising a memory for storing the locations of a set of telecommunications terminals;
  wherein said processor's ascertaining is based on the contents of said memory; and
  wherein said second telecommunications terminal belongs to said set of telecommunications terminals.

5. An apparatus comprising:
  a processor for
    receiving a transferring out request associated with a first telecommunications terminal,
    determining a first location that is the location of said first telecommunications terminal, and
    ascertaining the identity of a second telecommunications terminal that is closest to said first location and that said first telecommunications terminal is authorized to transfer signals to; and
  a transmitter for sending a message that causes a signal directed to said first telecommunications terminal to be transferred out to said second telecommunications terminal.

6. The apparatus of claim 5 further comprising a memory for storing transferring authorization information and the locations of a set of telecommunications terminals; wherein said processor's ascertaining is based on the contents of said memory; and wherein said set of telecommunications terminals comprises said first telecommunications terminal and said second telecommunications terminal.

7. An apparatus comprising:
  a processor for
    receiving a transferring in request associated with a first telecommunications terminal,
    determining a first location that is the location of said first telecommunications terminal, and
    ascertaining the identity of a second telecommunications terminal that is closest to said first location and that said first telecommunications terminal is authorized to transfer signals to; and
  a transmitter for sending a message that causes a signal directed to said second telecommunications terminal to be transferred in to said first telecommunications terminal.

8. The apparatus of claim 7 further comprising a memory for storing transferring authorization information and the locations of a set of telecommunications terminals; wherein said processor's ascertaining is based on the contents of said memory; and wherein said set of telecommunications terminals comprises said first telecommunications terminal and said second telecommunications terminal.

9. An apparatus comprising:
  a receiver for receiving a bridging out request associated with a first telecommunications terminal;
  a memory for storing a forwarding record for said first telecommunications terminal;
  a switching fabric; and
  a processor for
    determining a first location that is the location of said first telecommunications terminal,
    ascertaining the identity of a second telecommunications terminal that is closest to said first location, and populating said forwarding record so that said switching fabric bridges out a signal directed to said first telecommunications terminal to said second telecommunications terminal.

10. The apparatus of claim 9 wherein said memory is also for storing the locations of a set of telecommunications terminals.

11. An apparatus comprising:
a receiver for receiving a bridging in request associated with a first telecommunications terminal;
a memory for storing a forwarding record for said first telecommunications terminal;
a switching fabric; and
a processor for
determining a first location that is the location of said first telecommunications terminal,
ascertaining the identity of a second telecommunications terminal that is closest to said first location, and
populating said forwarding record so that said switching fabric bridges in a signal directed to second telecommunications terminal to said first telecommunications terminal.

12. The apparatus of claim 11 wherein said memory is also for storing the locations of a set of telecommunications terminals.

13. An apparatus comprising:
a receiver for receiving a bridging out request associated with a first telecommunications terminal;
a memory for storing a forwarding record for said first telecommunications terminal and
bridging authorization information;
a switching fabric; and
a processor for
determining a first location that is the location of said first telecommunications terminal,
ascertaining, based on said bridging authorization information, the identity of a second telecommunications terminal that is closest to said first location and that said first telecommunications terminal is authorized to bridge signals to, and
populating said forwarding record so that said switching fabric bridges out a signal directed to said first telecommunications terminal to said second telecommunications terminal.

14. The apparatus of claim 13 wherein said memory is also for storing the locations of a set of telecommunications terminals.

15. An apparatus comprising:
a receiver for receiving a bridging in request associated with a first telecommunications terminal;
a memory for storing a forwarding record for said first telecommunications terminal and
bridging authorization information;
a switching fabric; and
a processor for
determining a first location that is the location of said first telecommunications terminal,
ascertaining, based on said bridging authorization information, the identity of a second telecommunications terminal that is closest to said first location and that said first telecommunications terminal is authorized to bridge signals to, and
populating said forwarding record so that said switching fabric bridges in a signal directed to said second telecommunications terminal to said first telecommunications terminal.

16. The apparatus of claim 15 wherein said memory is also for storing the locations of a set of telecommunications terminals.

* * * * *